United States Patent
Huang et al.

(10) Patent No.: US 11,675,325 B2
(45) Date of Patent: Jun. 13, 2023

(54) CUTTER/ROCK INTERACTION MODELING

(71) Applicant: Schlumberger Technology Corporation, Sugar Land, TX (US)

(72) Inventors: Yansong Huang, Beijing (CN); Paul Bolchover, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 356 days.

(21) Appl. No.: 16/838,649

(22) Filed: Apr. 2, 2020

(65) Prior Publication Data
US 2020/0320390 A1   Oct. 8, 2020

Related U.S. Application Data

(60) Provisional application No. 62/829,594, filed on Apr. 4, 2019.

(51) Int. Cl.
*G06N 3/08* (2006.01)
*G05B 17/02* (2006.01)
(Continued)

(52) U.S. Cl.
CPC ........... *G05B 17/02* (2013.01); *G05B 13/027* (2013.01); *G05B 13/04* (2013.01);
(Continued)

(58) Field of Classification Search
CPC ...... G06N 3/08; G06N 3/0454; G05B 13/027; G05B 13/04; G05B 23/0283;
(Continued)

(56) References Cited

U.S. PATENT DOCUMENTS 6,516,293 B1  2/2003 Huang et al.
6,785,641 B1  8/2004 Huang
(Continued)

OTHER PUBLICATIONS

Akbari, et al., "A linearized formulation of AC multi-year transmission expansion planning: A mixed-integer linear programming approach," Electric Power Systems Research, 2014, vol. 114, pp. 93-100.
(Continued)

*Primary Examiner* — Duy M Dang
(74) *Attorney, Agent, or Firm* — Jeffrey D. Frantz

(57) ABSTRACT

A computer-implemented method may include receiving test data representing a cutter/rock interaction for a cutter/rock pair; calibrating an analytical model to represent the cutter/rock interaction mechanism for a cutter/rock pair; applying the calibrated analytical model to expand the test data to form one of a plurality of expanded test datasets; generating a first neural network model, of a plurality of first neural network models, representing cutter/rock interaction between a plurality of cutters of different cutter sizes and a particular rock type, wherein the first neural network is generated using the plurality of expanded test datasets as training input; generating a second neural network model using the plurality of first neural network models as training input, wherein the second neural network model represents non-tested cutter/rock interactions between a plurality of cutters of different cutter sizes and a plurality of rock types.

20 Claims, 8 Drawing Sheets

(51) Int. Cl.
G05B 23/02 (2006.01)
G05B 13/02 (2006.01)
G06F 16/9038 (2019.01)
G06F 16/9035 (2019.01)
G05B 13/04 (2006.01)
G06F 18/214 (2023.01)
G06N 3/045 (2023.01)
G06V 10/82 (2022.01)
G06V 20/13 (2022.01)

(52) U.S. Cl.
CPC ..... *G05B 23/0283* (2013.01); *G06F 16/9035* (2019.01); *G06F 16/9038* (2019.01); *G06F 18/214* (2023.01); *G06N 3/045* (2023.01); *G06N 3/08* (2013.01); *G06V 10/82* (2022.01); *G06V 20/13* (2022.01)

(58) Field of Classification Search
CPC ........... G05B 2219/45129; G05B 2219/45148; G05B 2219/49229; G06F 16/9035; G06F 16/9038; G06K 9/6256; G06V 10/82
See application file for complete search history.

(56) References Cited

U.S. PATENT DOCUMENTS

| | | | |
|---|---|---|---|
| 6,873,947 B1 | 3/2005 | Huang et al. | |
| 7,139,689 B2 | 11/2006 | Huang | |
| 7,464,013 B2 | 12/2008 | Huang et al. | |
| 7,693,695 B2 | 4/2010 | Huang et al. | |
| 7,844,426 B2 | 11/2010 | Huang | |
| 8,401,831 B2 | 3/2013 | Tang et al. | |
| 2004/0014342 A1 | 1/2004 | Yu et al. | |
| 2004/0211596 A1 | 10/2004 | Huang | |
| 2005/0010382 A1 | 1/2005 | Oliver et al. | |
| 2005/0096847 A1 | 5/2005 | Huang | |
| 2008/0262810 A1* | 10/2008 | Moran | E21B 7/00 703/10 |
| 2019/0292898 A1* | 9/2019 | Quattrone | E21B 7/04 |
| 2022/0156429 A1 | 5/2022 | Gan et al. | |

OTHER PUBLICATIONS

Dagrain, et al., "Influence of the cutter geometry in rock cutting," Jul. 2001.

Detournay, et al., "A phenomenological model for the drilling action of drag bits," International Journal of Rock Mechanics and Mining Sciences and Geomechanics Abstracts, vol. 29, Issue 1, pp. 13-23, Jan. 1992.

Melo, et al., "A Single Euler Solution Per Anomaly," 76th EAGE Conference & Exhibition 2014, Amsterdam RAI, The Netherlands, Jun. 16-19, 2014.

Rahmani, et al., "Design and management of high-performance, reliable and thermal-aware 3D networks-on-chip," IET Circuits, Devices, Systems, Sep. 2012, vol. 6, Issue 5, pp. 308-321.

Dou Xie et al., Application of an innovative ridge-ladder-shaped polycrystalline diamond compact cutter to reduce vibration and improve drilling speed. Science Progress, VI. 103(3), pp. 1-20, 2020.

* cited by examiner

CUTTER/ROCK INTERACTION MODELING

CROSS-REFERENCE TO RELATED APPLICATIONS

This application claims priority to U.S. Provisional Patent Application 62/829,594, which was filed on Apr. 4, 2019, and is incorporated herein by reference in its entirety.

BACKGROUND

Rock cutting may be implemented to access resources, access or make a path, drill a hole in terrain (e.g., for a rig, or other type of equipment), shape terrains, or for other purposes. Rock cutters may include equipment for executing rock cutting activities. Effective rock cutting may involve the application of the correct amount of force in order for a rock/terrain to be properly cut at the correct depth and shape, without damaging surroundings. Rock cutter force may be calculated using a drilling simulator. Cutter force calculations may be based on a set of cutter/rock tests.

SUMMARY

A computer-implemented method may include receiving test data representing a cutter/rock interaction for a cutter/rock pair, calibrating an analytical model to represent the cutter/rock interaction mechanism for a cutter/rock pair, applying the calibrated analytical model to expand the test data to form one of a plurality of expanded test datasets, generating a first neural network model, of a plurality of first neural network models, representing cutter/rock interaction between a plurality of cutters of different cutter sizes and a particular rock type. The first neural network is generated using the plurality of expanded test datasets as training input. The method further includes generating a second neural network model using the plurality of first neural network models as training input. The second neural network model represents non-tested cutter/rock interactions between a plurality of cutters of different cutter sizes and a plurality of rock types.

Embodiments of the disclosure may also provide a computing system, including one or more processors, and a memory system comprising one or more non-transitory computer-readable media storing instructions that, when executed by at least one of the one or more processors, cause the computing system to perform operations. The operations may include receiving test data representing a cutter/rock interaction for a cutter/rock pair, calibrating an analytical model to represent the cutter/rock interaction mechanism for a cutter/rock pair, applying the calibrated analytical model to expand the test data to form one of a plurality of expanded test datasets, generating a first neural network model, of a plurality of first neural network models, representing cutter/rock interaction between a plurality of cutters of different cutter sizes and a particular rock type. The first neural network is generated using the plurality of expanded test datasets as training input. The operation may further include generating a second neural network model using the plurality of first neural network models as training input. The second neural network model represents non-tested cutter/rock interactions between a plurality of cutters of different cutter sizes and a plurality of rock types.

Embodiments of the disclosure may further provide a non-transitory computer-readable medium storing instructions that, when executed by one or more processors of a computing system, cause the computing system to perform operations. The operations may include receiving test data representing a cutter/rock interaction for a cutter/rock pair, calibrating an analytical model to represent the cutter/rock interaction mechanism for a cutter/rock pair, applying the calibrated analytical model to expand the test data to form one of a plurality of expanded test datasets, generating a first neural network model, of a plurality of first neural network models, representing cutter/rock interaction between a plurality of cutters of different cutter sizes and a particular rock type. The first neural network is generated using the plurality of expanded test datasets as training input. The operation may further include generating a second neural network model using the plurality of first neural network models as training input. The second neural network model represents non-tested cutter/rock interactions between a plurality of cutters of different cutter sizes and a plurality of rock types.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
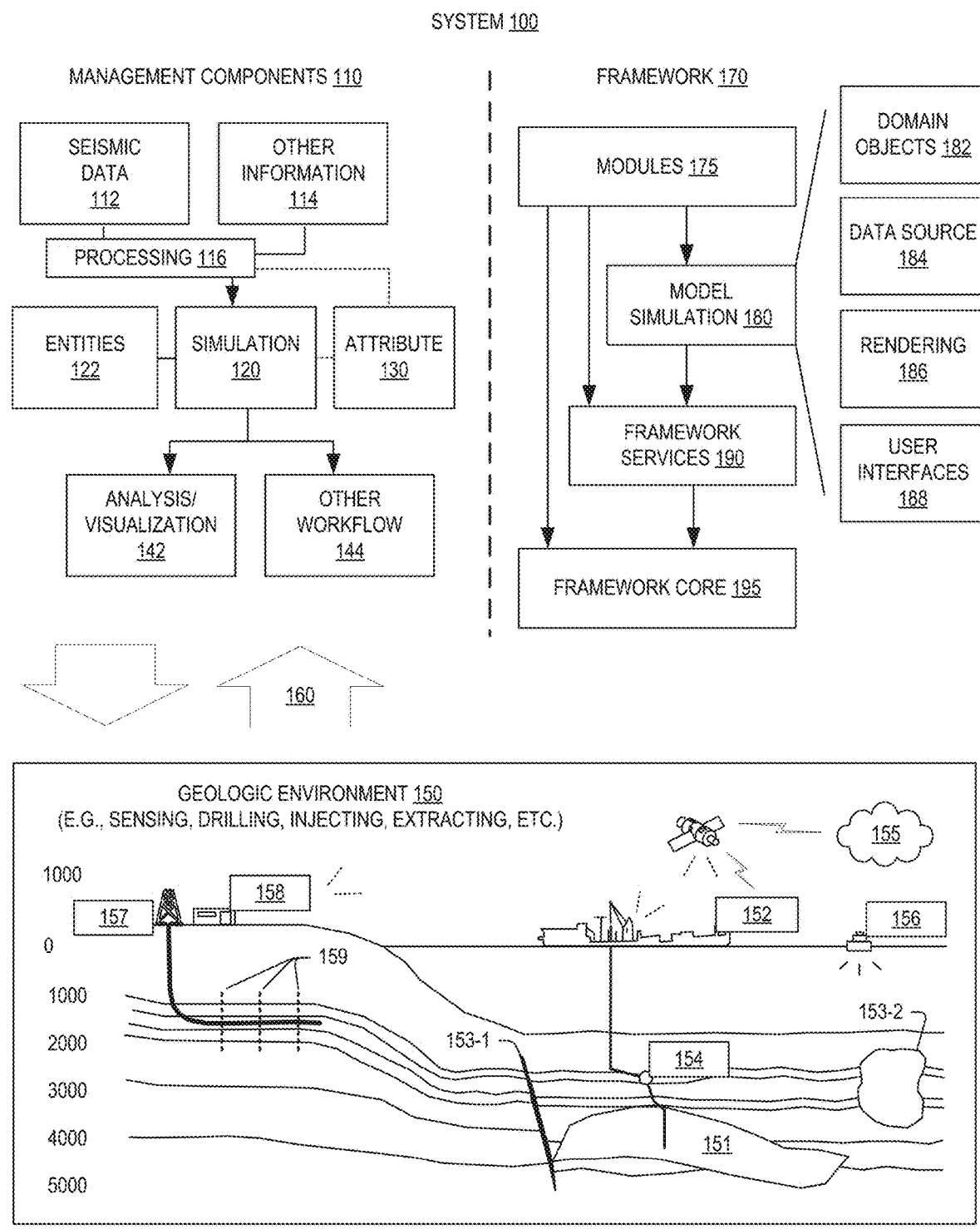
FIG. 1 illustrates an example of a system that includes various management components to manage various aspects of a geologic environment, according to an embodiment.

Rock cutter force (e.g., for effective rock cutting to access resources, access or make a path, drill a hole in terrain, shape terrain, etc.) may be calculated using a drilling simulator. For example, variables such as cutter size, rock attributes (e.g., rock type, rock geological properties, etc.), BR (back rake) angles, SR (side rake) angles, DOCs (depths of cut) and CPs (confining pressure)s may be inputs into the simulator for estimating rock cutter forces to apply in a cutting operation.

Cutter force calculations may be based on a set of cutter/rock tests in which the cutter/rock tests identify cutting behavior for different cutter sizes used to cut different rock types at different BR angles, SR angles, DOCs, and/or CPs. Cutter-rock tests may be timely and expensive, and, as a result, the amount of testing data is insufficient. That is, it is not feasible to generate a complete set of testing data for every cutter size and every rock type. As such, the amount of data available to a simulator may be relatively small when considering the number of combinations of rock cutter sizes and rock types. To account for this insufficiency in data, simulators may need to interpolate, extrapolate, and/or approximate certain data in order to determine cutter force. Such approximations may be inaccurate and may result in slower and/or more expensive rock cutting efforts, as well as slower simulations, and additional wear and tear on rock cutting equipment.

Accordingly, aspects of the present disclosure may include a method to physically extrapolate rock cutting test data from a limited dataset of real-life rock cutting test data. In this way, real-life rock cutting test data may be expanded to create synthetic cutter/rock data files having a richer, more complete set of data, without the need to perform extensive rounds of cutter/rock tests for different cutter sizes, rock types, BR angles, SR angles, DOCs, and/or CPs. As described herein, the complete set of cutter/rock data may be used as inputs into a cutter force simulation, thereby improving simulation speed, accuracy and effectiveness. In turn, cutting efforts are congruently improved with shorter, more accurate, and more effective rock and/or terrain cuts.

In some embodiments, machine learning techniques may be employed to train a neural network such that the trained neural network includes the complete set of cutter/rock data, which may identify cutter/rock interactions (e.g., cutter forces for different BR angles, SR angles, CPs, and depths of cut). In some embodiments, the neural network model may identify cutter/rock interactions for different cutter sizes used to cut different types of rocks having different properties. Thus, data from the neural network model may be used as an input to a simulator to more accurately estimate cutter/rock interactions for different cutter sizes and different rock types.

In embodiments, a 3D analytical model may be developed to describe or model the cutter/rock interaction behavior. For the cutter/rock test of each cutter/rock pair, a model-based inversion workflow may be performed to calibrate the model using available test data. With a well-calibrated model, a set of synthetic cutter/rock test data may be generated for additional BR (back rake) angles, SR (side rake) angles, DOCs (depth of cut) and CPs (confining pressure).

As described herein, a calibrated analytical model for each cutter/rock pair may be used to generate dense synthetic cutter/rock test data. A machine-learning model for a particular rock type may be trained by using all synthetic cutter/rock test data of the rock as training data. In some embodiments, training data tuning may be implemented to compensate for and/or correct systemic underestimate or overestimates of analytical models for cutter/rock pairs. As such, the machine-learning model may be used to generate a synthetic cutter/rock test file (e.g., cutter/rock dataset) for any cutter size to a particular type of rock. Using a similar approach, machine-learning models may be used to generate synthetic cutter/rock test file for any cutter size to other types of rocks having different properties (e.g., geomechanical or petrophysical). As a result, a new machine-learning model for all rocks and cutter sizes may be trained. By using this model, synthetic cutter/rock test files for any cutter size to any rock may be generated. These synthetic cutter/rock test files may be used by rock cutter simulators to estimate proper cutting forces for different cutter sizes, rock types, BR angles, SR angles, DOCs, and/or CPs.

In embodiments, both the analytical model and the machine-learning model may be used to generate synthetic cutter/rock test files (e.g., datasets of cutter/rock parameters and calculated forces), which may be used directly in a rock cutting simulator to eliminate mathematical extrapolation, hence improving accuracy. By using a machine-learning model for generating synthetic cutter/rock test file on demand, a workflow (e.g., a cutter/rock test file selection) may be automated and improved by an optimization to match an offset well. In embodiments, the techniques described herein may detect formation change and provide a 3D slope for formation. An optimization on the synthetic cutter/rock test file from the machine-learning model may be applied to determine the best rock which would result in the simulation returning a match of the 3D slope. In embodiments, automatic synthetic cutter/rock test file generation may be embedded in a drilling request or drilling instruction/control system to streaming user request submissions for simulation with more complete and richer cutter/rock test file datasets.

Aspects of the present disclosure may input cutter/rock test files from a controlled environment (e.g., a lab). Outputs may include the calibrated analytical models and trained machine-learning model (e.g., neural network models) which may be synthetic cutter/rock test files. The synthetic cutter/rock test files (e.g., trained neural network model) may improve the accuracy of simulation and improve the cutter/rock test file selection workflow. By introducing an optimization on the offset well or a bit performance line, the automatic cutter/rock test file generation workflow may result in more accurate simulation results to the real field environment, thereby resulting in more accurate real time drilling performance. In addition, the analytical model allows investigation of the cutter/rock test files from a lab environment in order to identify anomalous behavior in cutter/rock test files.

Aspects of the present disclosure may include a technique to discover 3D cutter/rock interaction behaviors. Aspects of the present disclosure may include a workflow to evaluate an analytical model. In some embodiments, model-based inversion may be completed for an analytical model with cutter/rock experimental data. The outcome model may be used to generate reconstructions which are compared with experimental data. Evaluation of these models using experimental data. Further, analytical models may be defined for a specific cutter/rock pair.

For the analytical model, the cutting scheme in the 2D model may be adopted and extended to 3D. Further, several other phenomena may be included in the new 3D analytical model, such as cutter/rock interface friction angle change according to BR angle and the groove effect in the cutter/rock test. As a result, the 3D model illustrates the cutter/rock interaction more accurately and richly than the published models. The machine-learning model may represent the cutter/rock interaction for any cutter size on one rock, or for any cutter size on any rock.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms.

These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
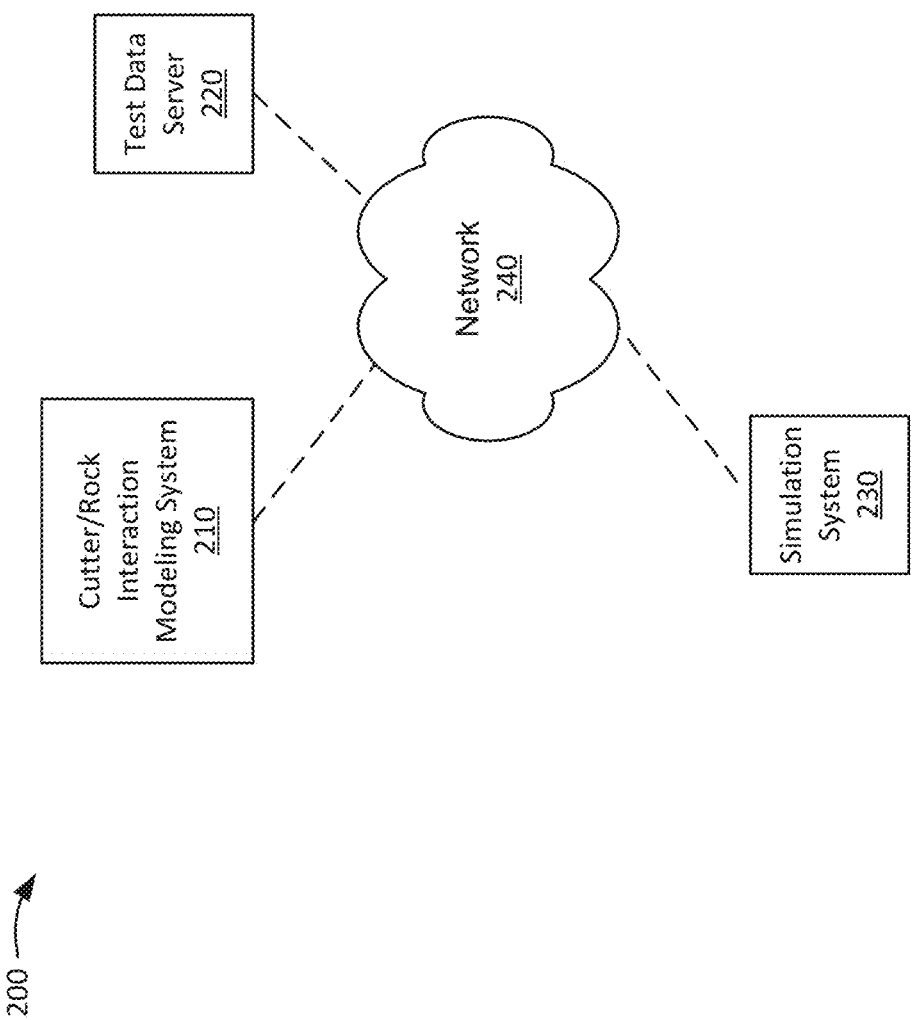
FIG. 2 illustrates an example environment in accordance with aspects of the present disclosure.

FIG. 2 illustrates an example environment in accordance with aspects of the present disclosure. As shown in FIG. 2, environment 200 includes a cutter/rock interaction modeling system 210, a test data server 220, a simulation system 230, and a network 240.

The cutter/rock interaction modeling system 210 may include one or more computing devices that generates a neural network model identifying cutter/rock interactions (e.g., cutter force estimates for different BR angles, SR angles, CPs, and depths). In some embodiments, the neural network model may identify cutter/rock interactions for different cutter sizes used to cut different types of rocks having different properties. In some embodiments, the cutter/rock interaction modeling system 210 may receive test data from the test data server 220 (e.g., a cutter/rock test file describing cutter/rock interactions for a select combination of BR angles, SR angles, CPs, and depths). In some embodiments, the cutter/rock interaction modeling system 210 may model cutter/rock interaction based on the test data. For example, the cutter/rock interaction modeling system 210 may generate a calibrated analytical model from the test data, apply the calibrated analytic model to expand the test data. In some embodiments, the cutter/rock interaction modeling system 210 may use the expanded set of data may as training data to form a neural network describing cutter/rock interactions for multiple cutter sizes and one rock type. In some embodiments, the cutter/rock interaction modeling system 210 may use the neural network describing cutter/rock interactions for multiple cutter sizes and one rock type as training data to form a neural network model describing cutter/rock interactions for multiple cutter sizes and multiple rock types. In some embodiments, the cutter/rock interaction modeling system 210 may provide the neural network model describing cutter/rock interactions for multiple cutter sizes and multiple rock types to the simulation system 230. Additionally, or alternatively, the cutter/rock interaction modeling system 210 may provide (e.g., to the simulation system 230) a synthetic data file derived from the network model in which the synthetic data file describes cutter/rock interactions for multiple cutter sizes and multiple rock types.

The test data server 220 may include one or more computing devices that stores test data of cutter/rock interactions. For example, the test data server 220 may store multiple sets of test data (e.g., experimental data) in which each set of test data describes cutter/rock interactions (e.g., rock cutter force) for a particular cutter size and a particular rock for a select combination of cutter BR angles, SR angles, CPs, and depths. In some embodiments, the test data may be based on a testing procedure (e.g., in a controlled or lab environment) in which rock cutter forces for cutting particular rock types at different cutter BR angles, SR angles, CPs, and depths are determined as part of the testing procedure. As described herein, the test data may be ultimately expanded to a neural network describing cutter/rock interactions for multiple cutter sizes and multiple rock types.

The simulation system 230 may include one or more computing devices that executes simulations and/or estimates cutter forces based on input cutting parameters (e.g., cutter size, rock type/properties, cutter BR angles, SR angles, CPs, and/or depths). In some embodiments, the simulation system 230 may use data from the neural network model describing cutter/rock interactions for multiple cutter sizes and multiple rock types (e.g., generated by the cutter/rock interaction modeling system 210) as part of the simulation. Additionally, or alternatively, the simulation system 230 may use a synthetic test file, derived from the neural network, as part of the simulation. Additionally, or alternatively, simulation system 230 may estimate cutter forces of a bit or the total bit forces, and/or may simulate the behavior of the drilling systems from top drive to the drill pipe, the downhole assembly and/or the bit/reamer based on the cutter force calculations.

The network 240 may include network nodes and one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3A:
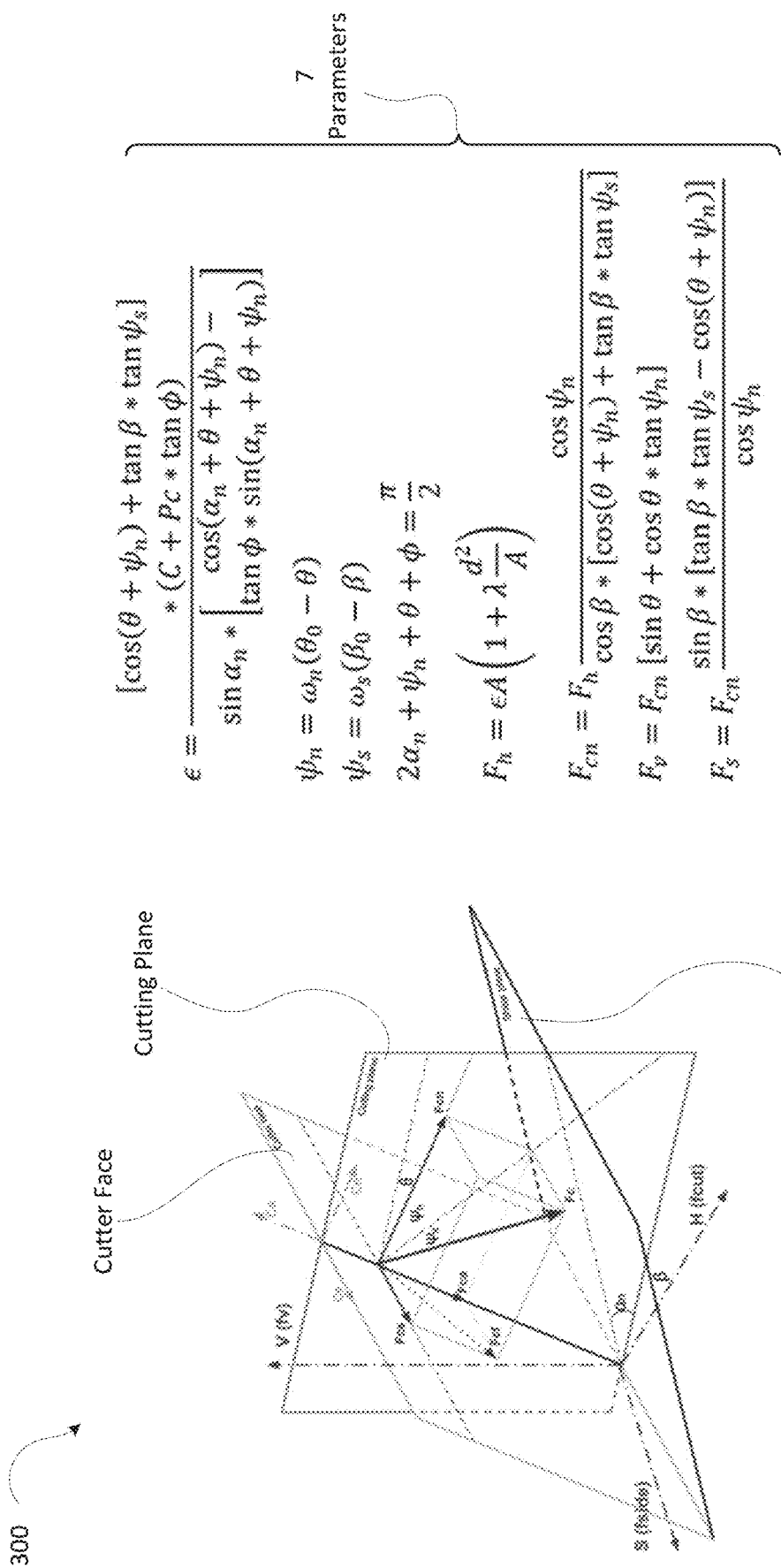
FIG. 3A illustrates a 3D analytical model that represents cutter/rock interaction in accordance with aspects of the present disclosure.

FIG. 3A illustrates an analytical model 300 that represents cutter/rock interaction. In one example embodiment, the purpose of the analytical model 300 is to calculate the three forces of the cutter (fcut, fv, and fside) based on backrake (BR), SR (side rake) angle, depth of cut (DOC) and confining pressure (CP) as input. As described herein, the analytical model 300 may be specific for a cutter/rock pair. Thus, as described herein, different analytic models 300 may be generated for different cutter/rock pairs.

In some embodiments, the analytical model 300 may be deduced by adopting the 2D model and considering other phenomenon in the cutting process, such as cutter/rock interface friction angle change according to back rake (BR) angle and the groove effect in the cutter/rock test. As described herein, a total of seven parameters may be defined in the analytical model 300, which may be fixed parameters used to calculate the three cutter forces based on the BR angle, SR angle, DOC, and CP inputs. In some embodiments, a calibration process may be performed to determine and refine the values of the seven parameters (as to be discussed in greater detail with respect to FIG. 3B).

As shown in FIG. 3A, the analytical model 300 may include a "cutter face," which may refer to the plane of a cutter's front surface. The "cutting plane" may refer to the plane vertical to the rock surface in which the cutter moves rightward. The "shear plane" may refer to the plane of the rock failure, or, in other words, the plane following which the rock may experience a shear failure. The coordinates system (V, S, H) is defined as following the final cutter forces, although other coordinates systems may be used. The analytical model 300 may be based on the assumption that the cutter-rock interaction is characterized by the coexistence of two processes (e.g., cutting of the rock and frictional contact underneath the cutters). In some embodiments, the analytical model 300 may further assume that the rock cutting follows a Mohr-Coulomb failure criteria on shear plane and the angle of failure is the one that minimizes the tangential force on the cutter. By considering the impacts on rock cutting of BR angle, SR angle, CP and the groove effect, the full analytical model 300 of a rock cutter (e.g., a PDC cutter) provides a highly accurate estimate of cutter/rock interaction.

As described herein, the analytical model 300 may include the following inputs:
 θ is the back rake angle;
 β is the side rake angle;
 d is the depth of cut; and
 Pc is the confining pressure.

The analytical model 300 may produce the following outputs:
 Fh is the cutting force;
 Fv is the vertical force;

Fs is the lateral force;

The analytical model 300 may include seven parameters which may define the behavior of the analytical model 300 and may be applied as part of producing the outputs from the inputs. These seven parameters may include:

C is the cohesion of the rock;

$\phi$ is the internal friction angle of the rock;

$\omega_n$, $\omega_s$, $\beta_0$ and $\theta_0$ are parameters for $\psi_n$ and $\psi_s$ calculation; and $\lambda$ is the groove factor.

As described herein, the analytical model 300 may be simplified to the following equation:

$$f = \begin{bmatrix} fv \\ fcut \\ fside \end{bmatrix} = M(BR, SR, CP, \text{Depth of Cut}) \quad (1)$$

where M denotes the analytical model 300, (BR, SR, CP, Depth of Cut) are the inputs of the analytical model 300 and f is the output which contains three components. Thus, the analytical model 300 may be used to determine the values of fv, fcut, and fside based on the inputs.

Figure 3B:
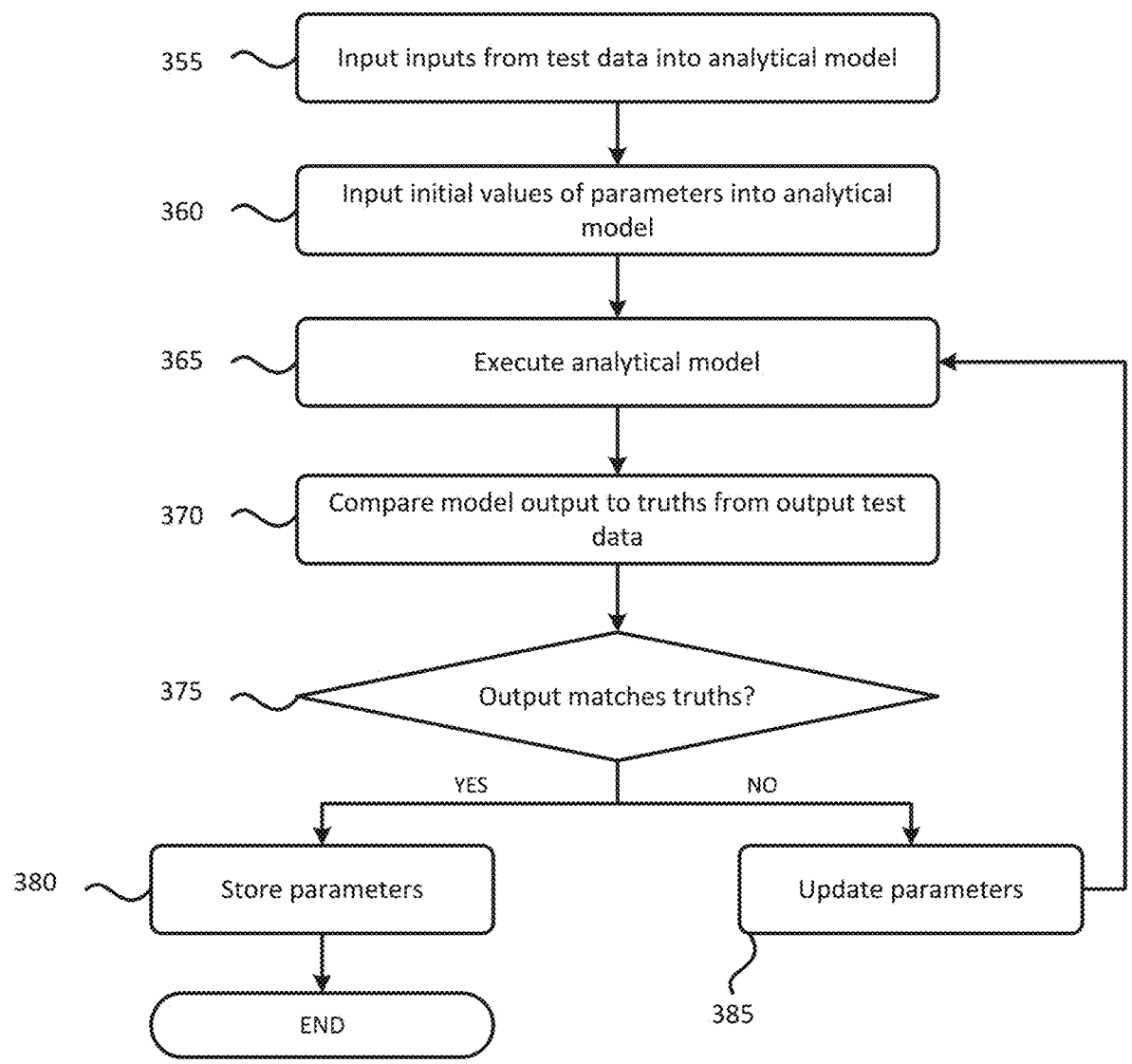
FIG. 3B illustrates an example of a model-based inversion calibration process in accordance with aspects of the present disclosure.

As described herein, the behavior and outputs produced by the analytical model 300 may be based on seven model parameters (e.g., as shown above). These seven parameters may be determined via a calibration process. FIG. 3B illustrates an example of a model-based inversion calibration process 350. For example, referring to FIG. 3B, the calibration process 350 (at 355) may include inputting a set of inputs from test data into the analytical model 300 (denoted as "M" in FIG. 3B). For example, the cutter/rock interaction modeling system 210 may input a set of inputs from test data into the analytical model 300. As described herein, the test data may include known output values (or truths) of fv, fcut, and fside for a select set of input BR angles, SR angles, depths of cuts, and CPs. For example, these known or truth output values may be determined in an experimental or test environment. As previously discussed, the test data may be limited and include only a select set of data, as testing every BR angle, SR angle, depth of cut, and CP is time and/or cost prohibitive. An example of test data is shown in data structure 505 of FIG. 5A.

Process 350 may also include inputting an initial set of values of parameters into the analytical model 300 (as at 360). For example, the cutter/rock interaction modeling system 210 may input an initial set of values of parameters into the analytical model 300. In some embodiments, the initial set of parameters may be default values, predetermined values, or values used from prior experimental data. Additionally, or alternatively, the values may simply be coefficients with values of one.

Process 350 may further include executing the analytical model 300 (as at 365). For example, the cutter/rock interaction modeling system 210 may execute the analytical model 300 using the inputs from the test data (from block 355) and the initial input parameter values (from block 360).

Process 350 may also include comparing the model output to truths from the output test data (as at 370). For example, the cutter/rock interaction modeling system 210 may compare the output (e.g., produced when executing the analytical model 300 at block 365) with truth values from the output test data (e.g., stored in the data structure 505).

Process 350 may further include determining whether the outputs match the truths (as at 375). If, for example, the outputs match the truth to a certain threshold or degree (block 375—YES), the parameters are established and stored (as at 380). The analytical model 300 may now be used to determine force values (e.g., ft, fcut, and fside) for any input values of BR angle, SR angle, depth of cut, and confining pressure. In this way, test data may be expanded as will be described in greater detail with respect to FIG. 4.

If, on the other hand, the outputs do not match the truth to a certain threshold or degree (block 375-NO), the parameters may be updated (as at 385) and process 350 may return to block 365 in which the updated parameters are used to execute the analytical model 300, and the outputs of the analytical model 300 are compared with the truths. Blocks 365 to 385 may be repeated until the outputs match the truth values to a threshold degree.

Figure 4:
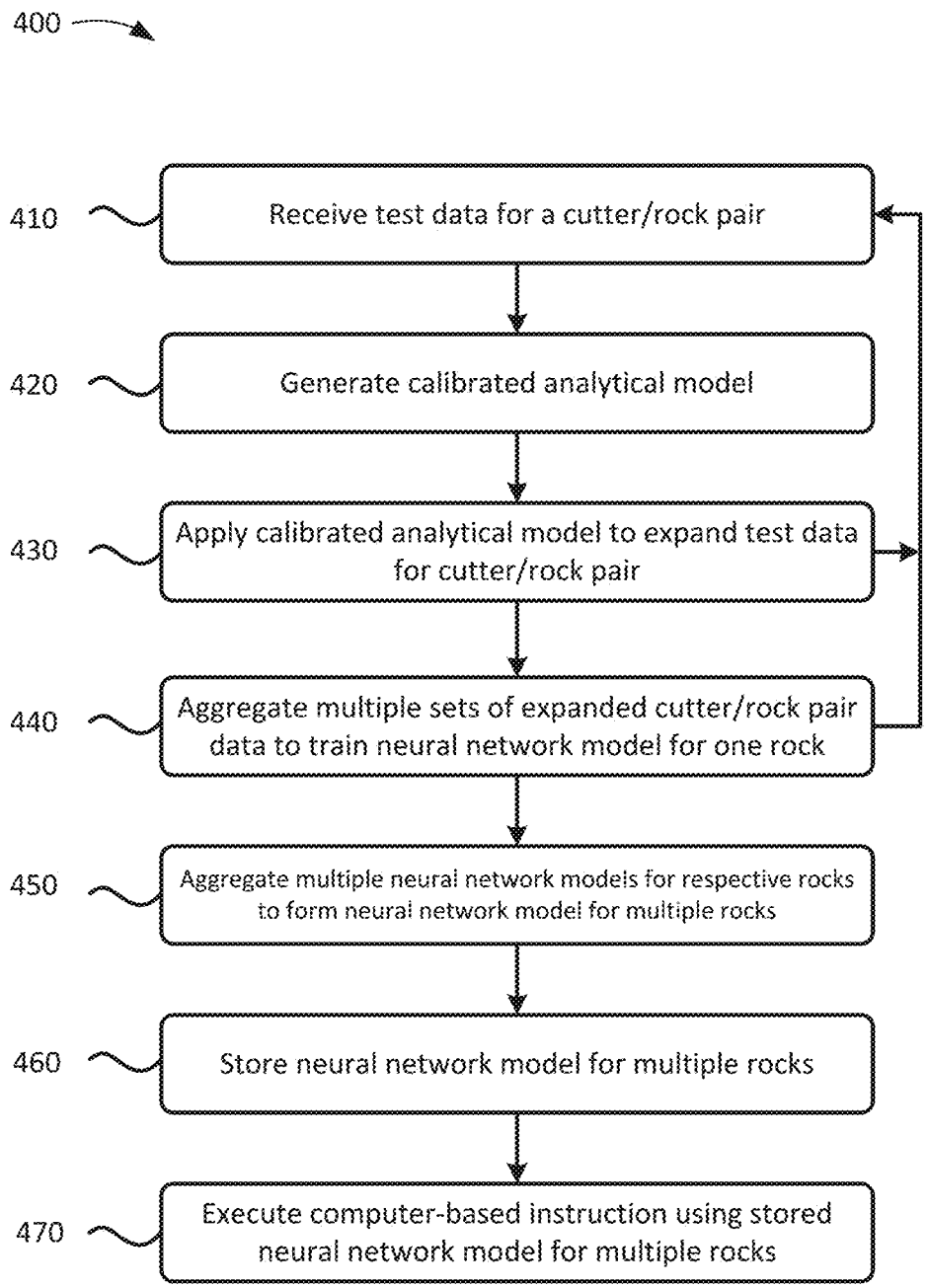
FIG. 4 illustrates an example flowchart of a process for training a neural network having data representing rock cutter interactions between different cutter sizes and rock types.

FIG. 4 illustrates an example flowchart of a process for training a neural network having data representing rock cutter interactions between different cutter sizes and rock types. The block of FIG. 4 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

Figure 5A:
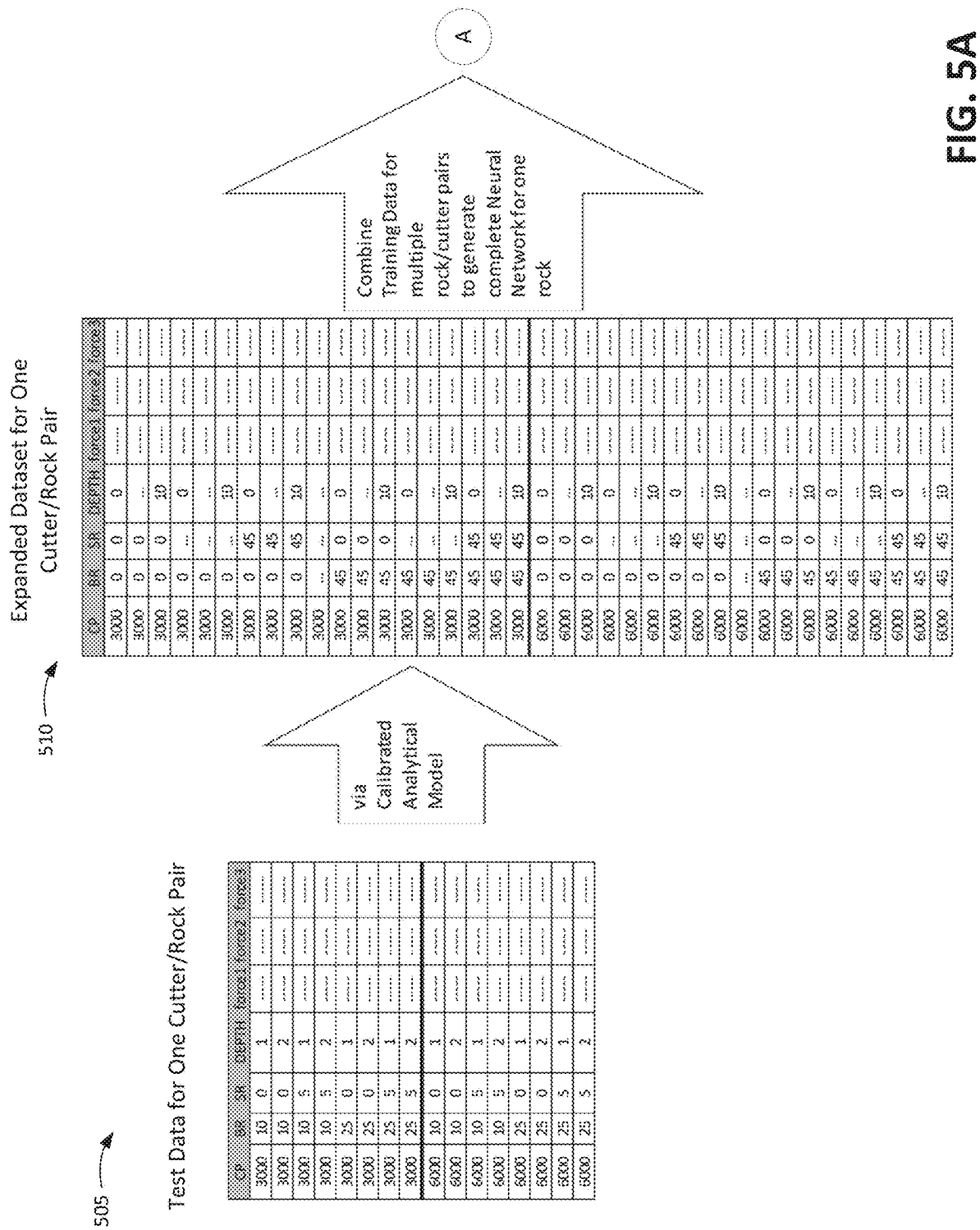
FIGS. 5A and 5B illustrate data structures representing test data and trained neural networks that expand the test data.

As shown in FIG. 4, process 400 may include receiving test data for a cutter/rock pair (as at 410). For example, the cutter/rock interaction modeling system 210 may receive test data for a cutter/rock pair from the test data server 220. As described herein, the test data for the cutter/rock pair may identify cutter forces for select CPs, BR angles, SR angles, and/or depths (e.g., the select CPs, BR angles, SR angles, and/or depths that have been tested and for which experimental data is available). An example of a data structure having test data for one cutter/rock pair is shown in FIG. 5A (e.g., in data structure 505). Referring to FIG. 5A, the data structure 505 may include rock cutter forces (e.g., force1, force 2, and force3) for a cutter of a particular size (e.g., 9 mm) cutting a particular type of rock at select CPs, BR angles, SR angles, and depths (e.g., those CPs, BR angles, SR angles, and depths that have been tested and for which experimental data is available). For clarity, values of force1, force2, and force3 have not been included in the data structure 505, however, it is understood that in practice, the data structure 505 includes values (e.g., as determined during a testing process) for force1, force2, and/or force3.

Returning to FIG. 4, process 400 also may include generating a calibrated analytical model (as at 420). For example, the cutter/rock interaction modeling system 210 may generate a calibrated analytical model based on the test data for the cutter/rock pair (e.g., received at 410). In some embodiments, the cutter/rock interaction modeling system 210 may generate the calibrated analytical model in accordance with the process described in FIGS. 3A and 3B. For example, the cutter/rock interaction modeling system 210 may generate a 3D model that describes the cutter/rock interaction. The 3D model may take into consideration a variety of variables and/or phenomenon in the cutting, such as cutter-rock interface friction angle changes according to BR angle, as well as the groove effect from testing. In some embodiments, the analytical model may define seven parameters. For example, BR (back rake angle), SR (side rake angle), DOC (depth of cut) and CP (confining pressure) may be used as input to calculate the three forces of the cutter (e.g., the forces f_cut, f_v and f_side).

In some embodiments, model-based inversion may be performed to calibrate the 3D analytical model. For example, the cutter/rock interaction modeling system 210 may apply the model-based inversion using the test data to calibrate the analytical model (e.g., using the process 350 described in FIG. 3B). In some embodiments, statistics information may be determined to evaluate the quality of the calibrated model (e.g., as R2 score and adjusted R2 score). In some embodiments, the calibration may adjust the model parameters such that the R2 score and/or adjusted R2 score are within certain thresholds.

Process 400 further may include applying the calibrated analytical model to expand the test data for the cutter/rock pair (as at 430). For example, the cutter/rock interaction modeling system 210 may apply the calibrated analytical model to expand the test data for the cutter/rock pair. As an example, input values of CPs, BR angles, SR angles, and/or depths that were not previously tested and for which experimental data was not available may be input to the calibrated analytical model, and force values at these additional CPs, BR angles, SR angles, and/or depths may be determined using the calibrated analytical model. In this way, the cutter/rock interaction modeling system 210 may expand the test data to determine cutter forces for additional non-test data, such as CPs, BR angles, SR angles, and/or depths that were not previously tested and for which experimental data was not available. As such, the test data may be expanded and extrapolated such that cutter forces may be determined for additional CPs, BR angles, SR angles, and/or depths without actually needing to perform the corresponding tests.

An example of an expanded dataset for the cutter/rock pair is shown in a data structure 510 of FIG. 5A. Referring to FIG. 5A, the calibrated analytical model may be applied to the test data for the cutter/rock pair (e.g., the data structure 505). By applying the calibrated analytical model, the data structure 505 may be expanded to include the data shown in the data structure 510. More specifically, the data structure 510 may include additional cutter forces (force1, force2, and force 3) for additional CPs, BR angles, SR angles, and/or depths. As an example, the data structure 510 may expand the test data to include cutter forces for 3000 CP at BR angles and SR angles, ranging from 0 degrees to 45 degrees, and depths ranging from 0 to 10. Similarly, the data structure 510 may expand the test data to include cutter forces for 6000 CP at BR angles and SR angles, ranging from 0 degrees to 45 degrees, and depths ranging from 0 to 10.

Returning to FIG. 4, process 400 may return to block 410 in which test data for another cutter/rock pair may be received. For example, the cutter/rock interaction modeling system 210 may receive test data for a different cutter size and for the same rock. Process 400 may continue through blocks 420 and 430 such that an expanded dataset may be generated for another cutter/rock pair. As an example, referring to FIG. 5A, another data structure 510 may be generated for a different cutter size (e.g., 12 mm) and for the same rock type. Process 400 may return to blocks 410-430 in which test data for another cutter/rock pair may be received and expanded (e.g., a different cutter size, such as 13 mm and the same rock type). Process blocks 410-430 may be repeated until test data for all cutter/rock pairs for the same rock have been expanded. In this way, multiple sets of expanded cutter/rock pair data may be formed for all cutter sizes for the same rock type. That is, multiple data structures 510 may be formed in which each data structure 510 may identify the cutter/rock interaction between different cutter sizes and one rock type.

Figure 5B:
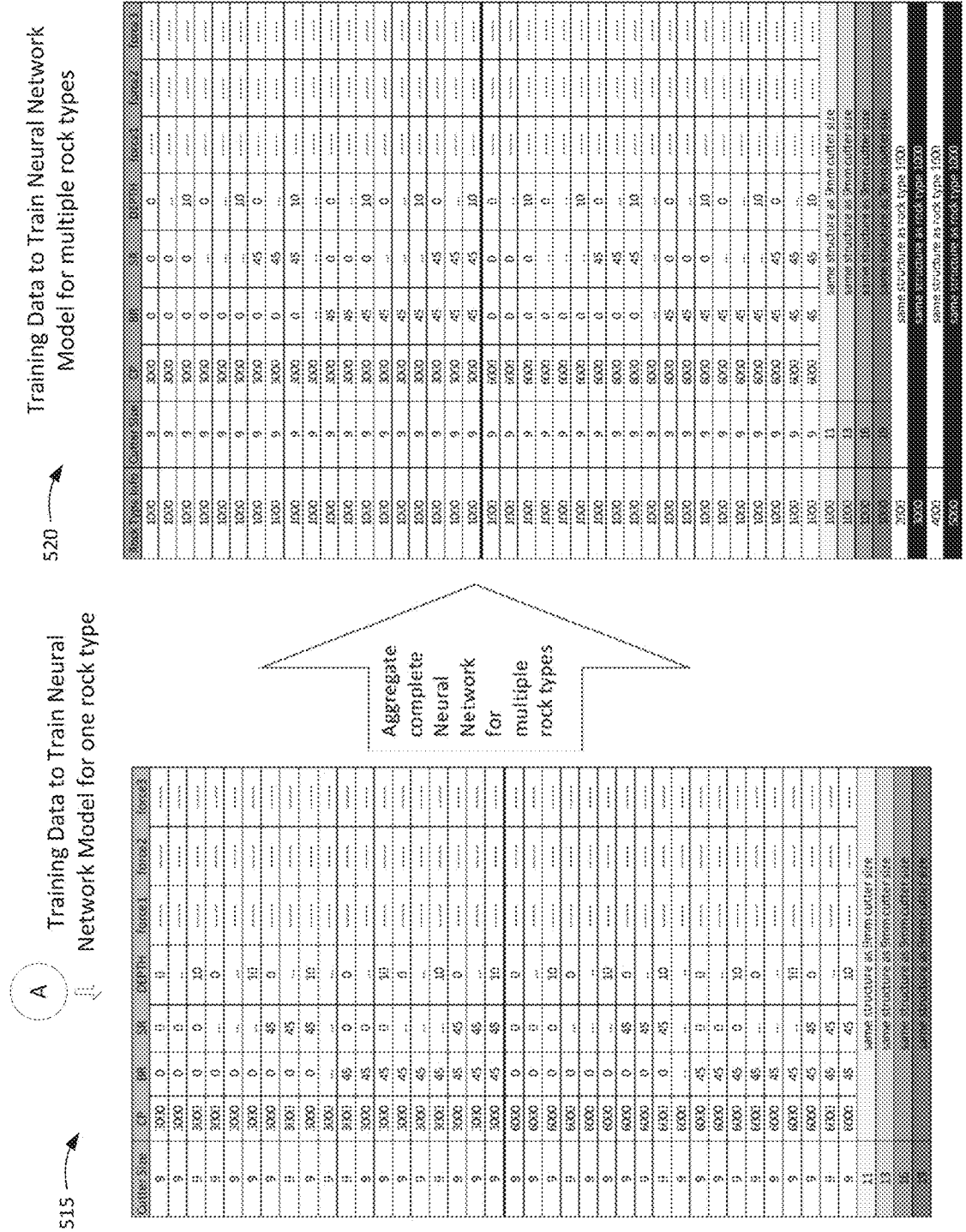

After test data for all cutter/rock pairs for the same rock have been expanded, process 400 may also include aggregating the multiple sets of expanded cutter/rock pair data to train a neural network model for one rock (as at 440). For example, the cutter/rock interaction modeling system 210 may aggregate the multiple sets of expanded cutter/rock pair data to train a neural network model for one rock type. That is to say, the cutter/rock interaction modeling system 210 may perform a machine learning process in which the multiple sets of expanded cutter/rock pair data may be used as training data. The machine learning process may involve aggregating the multiple sets of expanded cutter/rock pair data to form training data used to train a neural network model. For example, referring to FIG. 5A, multiple data structures 510 (e.g., multiple sets of expanded cutter/rock pair data for one rock type) may be combined or aggregated to generate a complete set of training data for one rock type. Referring to FIG. 5B, the training data for one rock type may be represented by data shown in a data structure 515. In some embodiments, the data structure 515 may include the expanded set of cutter/rock interaction data between the 9 mm, 11 mm, 13 mm, 16 mm, and 19 mm cutter sizes and one rock type. In some embodiments, the training data for one rock type may be used to train and generate a neural network model for one rock type.

In some embodiments, the trained neural network model may be evaluated against the test data (e.g., experimental data, such as data shown in the data structure 505) to verify that the trained neural network accurately predicts the cutter forces against known cutter forces based on BR angles, SR angles, depths, and CPs. In some embodiments, the neural network model may be adjusted or weights/tuning coefficients may be applied to improve the accuracy for the neural network model with respect to known or truth cutter forces. In some embodiments, back proportion and/or other techniques may be used to refine the neural network model.

Process 400 may return to block 410 in which blocks 410-440 may be repeated for different cutter/rock pairs of different cutter sizes and different rock types. That is, the cutter/rock interaction modeling system 210 may receive additional test datasets (e.g., represented by data structure 505) for different cutter/rock pairs (e.g., different cutter rock sizes for a single rock type), expand the datasets (e.g., as represented by the data structure 510), and aggregate the datasets to train and form a neural network model representing cutter/rock interactions (e.g., cutter force estimates) for multiple cutter sizes and a single rock type (e.g., as represented by data structure 515). Process blocks 410-440 may continue to be repeated such that multiple sets of training data for respective rock types may be formed (e.g., multiple data structures 515). In turn, the multiple sets of training data for respective rock types may be used to train and generate respective neural network models for respective rock types.

Process 400 may further include aggregating multiple neural network models for respective rocks to form neural network model for multiple rocks (as at 450). For example, the cutter/rock interaction modeling system 210 may aggregate multiple neural network models for respective rocks to generate a neural network model for multiple rocks (e.g., after repeating blocks 410-440, as discussed above to form the multiple neural network models for respective rock types). That is to say, the cutter/rock interaction modeling system 210 may implement a machine learning process to generate/train the neural network model for multiple rock types using the neural network models for respective rock types as training input. As described herein, the neural network model for multiple rock types may represent non-tested cutter/rock interaction for cutter/rock pairs (e.g., cutter/rock pairs for which interaction was not previously tested or the cutter/rock pairs for which experimental data representing the interaction does not exist). That is, the neural network model for multiple rock types may represent cutter/rock interactions for different cutter parameters (e.g., different cutter sizes, BR angles, SR angles, depths, CPs) when used to cut different rock types.

FIG. 5B illustrates an example of training data to train the neural network model for multiple rock types. For example, referring to FIG. 5B, training data for multiple neural network models for respective rock types (e.g., represented by multiple data structures 515) may be aggregated to form training data used to train a neural network for multiple rock types (e.g., represented by the data structure 520). As shown in FIG. 5B, the data structure 520 may identify the rock type (e.g., by an identifier, such as 1000, 2000, 3000, 4000, etc.) and the cutter/rock interactions (e.g., cutter forces) at multiple cutter sizes for multiple rocks. In some embodiments, the rock type identifiers may be linked to a different data structure or data source that identifies rock geological properties and/or attributes based on the rock type identifiers. In some embodiments, the neural network model for multiple rocks may be defined using back propagation and/or other type of neural network refinement technique.

Returning to FIG. 4, process 400 also may include storing the neural network model for multiple rocks (as at 460). For example, the cutter/rock interaction modeling system 210 may store the neural network model for multiple rocks. In some embodiments, the cutter/rock interaction modeling system 210 may store the neural network model for future use for any variety of applications.

Process 400 may further include executing a computer-based instruction using the stored neural network model for multiple rocks (as at 470). For example, the cutter/rock interaction modeling system 210 may execute a computer-based instruction using the stored neural network model for multiple rocks. As one example, the cutter/rock interaction modeling system 210 may execute a computer-based instruction to provide the neural network model and/or data derived from the neural network model to the simulation system 230 to be used as inputs into a simulation executed by the simulation system 230 (e.g., a simulation to estimate cutter forces needed for a cutting operations for cutting particular types of rocks). Additionally, or alternatively, the computer-based instruction may include an instruction to set up another automatic synthetic rock file generation workflow to achieve automatic formation detection using the neural network model for multiple rocks to. Additionally, or alternatively, an instruction may be executed to visually present the model and/or the cutter/rock interaction and description. Additionally, or alternatively, a control instruction may be generated to modify or control the operations of a cutter.

In some embodiments, the cutter/rock interaction modeling system 210 may determine cutter force estimates using the neural network model for multiple rocks. In this way, cutter force estimates may be determined for non-tested cutter/rock pairs. In some embodiments, the cutter/rock interaction modeling system 210 may execute a computer-based simulation based on the cutter force estimates. Additionally, or alternatively, the cutter/rock interaction modeling system 210 may adjusting a drilling plan based on results of the computer-based simulation, adjust a maintenance plan based the results of the computer-based simulation, adjust operations of a cutter based on the results of the computer-based simulation; and/or modify a workflow based on the results of the computer-based simulation.

FIGS. 5A and 5B illustrate data structures representing test data and trained neural networks that expand the test data. As shown in FIG. 5A, a data structure 505 may include test data for one cutter/rock pair. As described above with respect to FIG. 4, a calibrated analytical model may be applied to the test data to form an expanded dataset for one cutter/rock pair (e.g., as shown in data structure 510). As described above with respect to FIG. 4, and as shown in FIG. 5A, multiple expanded datasets for one cutter rock/pair may be combined or aggregated as part of a machine learning process to form training data used to train a complete neural network for one rock. For example, referring to FIG. 5B, training data to train a neural network model for one rock type may be formed (e.g., as represented by the data structure 515). As further shown in FIG. 5B, training data from multiple neural networks for multiple rock types may be aggregated as part of a machine learning process to form training data used to train a neural network model for multiple rock types (e.g., as represented by the data structure 520).

Aspects of the present disclosure may include a technique of building a neural network model (e.g., trained using machine learning techniques) to represent and describe cutter/rock interaction for one rock or more rocks. The technique may include model-based inversion to calibrate analytical model using experiment data, training data generation using the calibrated analytical model, machine-learning model training and training data tuning and machine-learning model improving based on model evaluation against experiment data. In some embodiments, the analytical model may be used separately as a tool to cross-check experimental cutter/rock test data and to generate synthetic cutter/rock test files for a specific cutter/rock pair. In embodiments, the analytical model may be changed to a numerical model to simulate the cutter/rock interaction. In some embodiments, the neural network model for one rock type may be used to study the effect of cutter sizes on the cutting mechanism, and to generate synthetic cutter/rock test files for one rock against different cutter sizes. The neural network model for multiple rocks may be used to set up an automatic synthetic rock file generation workflow with offset well matching, which may be used to automate and enhance current workflow.

Figure 6:
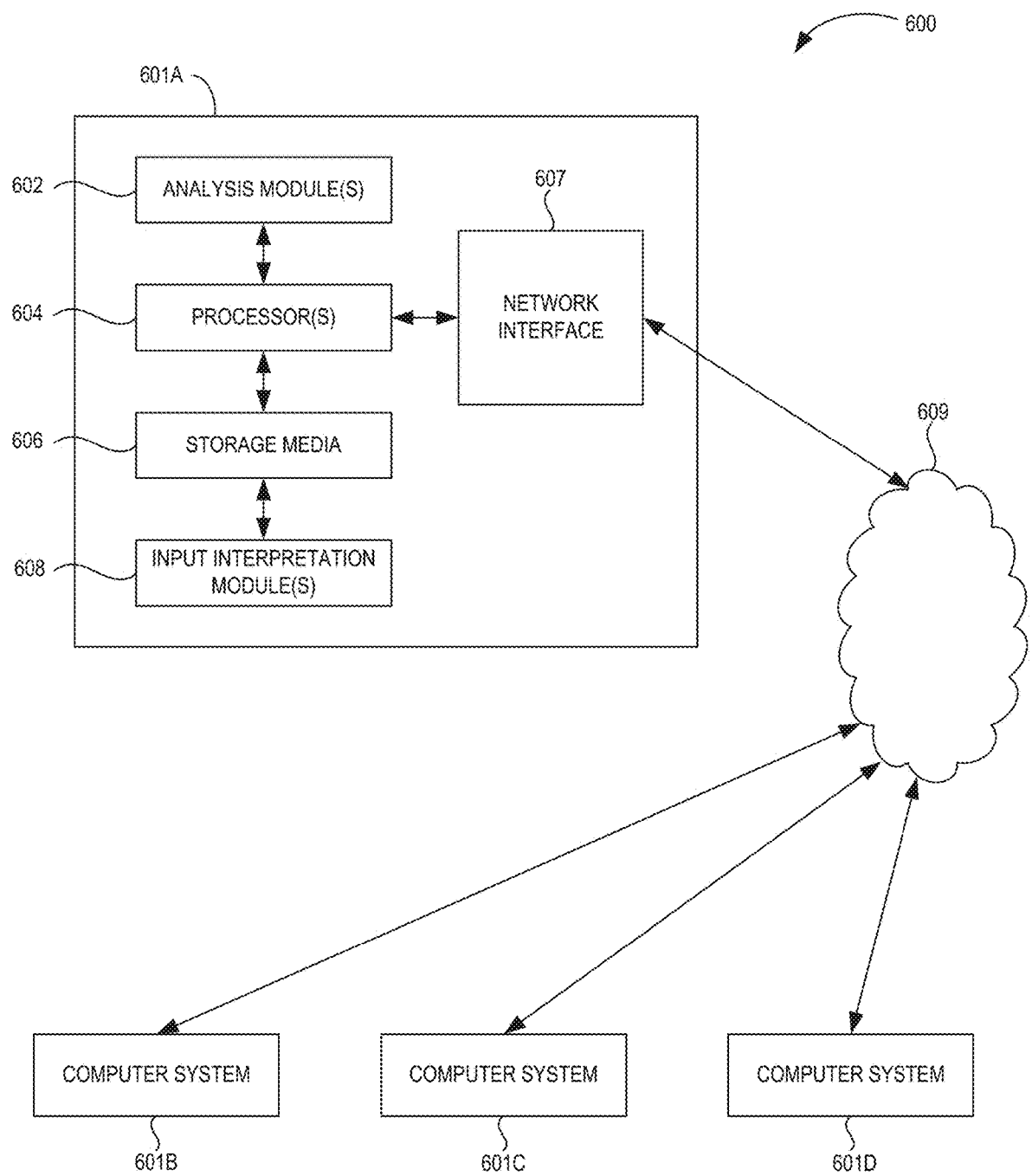
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more cutter/rock machine learning module(s) 608. In the example of computing system 600, computer system 601A includes the cutter/rock machine learning module 608. In some embodiments, a single cutter/rock machine learning module 608 may be used to perform some aspects of one or more embodiments of the methods disclosed herein. In other embodiments, a plurality of cutter/rock machine learning modules 608 may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure. Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A computer-implemented method comprising:
receiving test data representing a cutter/rock interaction for a cutter/rock pair;
calibrating an analytical model to represent the cutter/rock interaction for the cutter/rock pair;
applying the calibrated analytical model to expand the test data to form one of a plurality of expanded test datasets;
generating a first neural network model, of a plurality of first neural network models, representing cutter/rock interactions between a plurality of cutters of different cutter sizes and a particular rock type, wherein the first neural network is generated using the plurality of expanded test datasets as training input; and
generating a second neural network model using the plurality of first neural network models as training input, wherein the second neural network model represents non-tested cutter/rock interactions between a plurality of cutters of different cutter sizes and a plurality of rock types.

2. The method of claim 1, further comprising:
determining cutter force estimates using the second neural network model, wherein the cutter force estimates are determined for the non-tested cutter/rock interactions; and
executing a computer-based instruction based on the second neural network model or the cutter force estimates, wherein the computer-based instruction includes at least one selected from the group consisting of:
executing a computer-based simulation based on the cutter force estimates;
adjusting a drilling plan based on results of the computer-based simulation;
adjusting a maintenance plan based the results of the computer-based simulation;
adjusting operations of a cutter based on the results of the computer-based simulation;
modifying a workflow based on the results of the computer-based simulation;
providing the calibrated analytical model or data derived from the calibrated analytical model to a simulation system;
providing the first neural network model or data derived from the first neural network model to a simulation system;

providing the second neural network model or data derived from the second neural network model to a simulation system;

setting up automatic synthetic rock file generation workflow; and visually presenting the second neural network model or visually present cutter/rock interaction information.

3. The method of claim 1, further comprising refining the first neural network model or the second neural network model based on experimental data.

4. The method of claim 1, wherein the calibrated analytical model is calibrated using model-based inversion.

5. The method of claim 1, wherein the calibrated analytical model is a 3D model.

6. The method of claim 1, wherein the training the first neural network and the training the second neural network are based on machine learning techniques.

7. The method of claim 1, wherein:
the first neural network is used to obtain cutter rock forces based on:
cutter size,
confinement pressure,
back rake angle,
side rake angle, and
depth; and
the second neural network model is used to obtain cutter rock forces based on:
rock type,
cutter size,
confinement pressure,
back rake angle,
side rake angle, and
depth.

8. A computing system, comprising:
one or more processors; and
a memory system comprising one or more non-transitory computer-readable media storing instructions that, when executed by at least one of the one or more processors, cause the computing system to perform operations, the operations comprising:
receiving test data representing a cutter/rock interaction for a cutter/rock pair;
calibrating an analytical model to represent the cutter/rock interaction for the cutter/rock pair;
applying the calibrated analytical model to expand the test data to form one of a plurality of expanded test datasets;
generating a first neural network model, of a plurality of first neural network models, representing cutter/rock interactions between a plurality of cutters of different cutter sizes and a particular rock type, wherein the first neural network is generated using the plurality of expanded test datasets as training input; and
generating a second neural network model using the plurality of first neural network models as training input, wherein the second neural network model represents non-tested cutter/rock interactions between a plurality of cutters of different cutter sizes and a plurality of rock types.

9. The computing system of claim 8, wherein the operations further comprise:
determining cutter force estimates using the second neural network model, wherein the cutter force estimates are determined for the non-tested cutter/rock interactions; and executing a computer-based instruction based on the second neural network model or the cutter force estimates, wherein the computer-based instruction includes at least one selected from the group consisting of:
executing a computer-based simulation based on the cutter force estimates;
adjusting a drilling plan based on results of the computer-based simulation;
adjusting a maintenance plan based the results of the computer-based simulation;
adjusting operations of a cutter based on the results of the computer-based simulation;
modifying a workflow based on the results of the computer-based simulation;
providing the calibrated analytical model or data derived from the calibrated analytical model to a simulation system;
providing the first neural network model or data derived from the first neural network model to a simulation system;
providing the second neural network model or data derived from the second neural network model to a simulation system;
setting up automatic synthetic rock file generation workflow; and
visually presenting the second neural network model or visually present cutter/rock interaction information.

10. The computing system of claim 8, wherein the operations further comprise refining the first neural network model or the second neural network model based on experimental data.

11. The computing system of claim 8, wherein the calibrated analytical model is calibrated using model-based inversion.

12. The computing system of claim 8, wherein the calibrated analytical model is a 3D model.

13. The computing system of claim 8, wherein the training the first neural network and the training the second neural network are based on machine learning techniques.

14. The computing system of claim 8, wherein:
the first neural network is used to obtain cutter rock forces based on:
cutter size,
confinement pressure,
back rake angle,
side rake angle, and
depth; and
the second neural network model is used to obtain cutter rock forces based on:
rock type,
cutter size,
confinement pressure,
back rake angle,
side rake angle, and
depth.

15. A non-transitory computer-readable medium storing instructions that, when executed by one or more processors of a computing system, cause the computing system to perform operations, the operations comprising:
receiving test data representing a cutter/rock interaction for a cutter/rock pair;
calibrating an analytical model to represent the cutter/rock interaction for the cutter/rock pair;
applying the calibrated analytical model to expand the test data to form one of a plurality of expanded test datasets;
generating a first neural network model, of a plurality of first neural network models, representing cutter/rock interactions between a plurality of cutters of different cutter sizes and a particular rock type, wherein the first neural network is generated using the plurality of expanded test datasets as training input; and generating a second neural network model using the plurality of first neural network models as training input, wherein the second neural network model represents non-tested cutter/rock interactions between a plurality of cutters of different cutter sizes and a plurality of rock types.

16. The computer-readable medium of claim 15, wherein the operations further comprise:

determining cutter force estimates using the second neural network model, wherein the cutter force estimates are determined for the non-tested cutter/rock interactions; and executing a computer-based instruction based on the second neural network model or the cutter force estimates, wherein the computer-based instruction includes at least one selected from the group consisting of:

executing a computer-based simulation based on the cutter force estimates;

adjusting a drilling plan based on results of the computer-based simulation;

adjusting a maintenance plan based the results of the computer-based simulation;

adjusting operations of a cutter based on the results of the computer-based simulation;

modifying a workflow based on the results of the computer-based simulation;

providing the calibrated analytical model or data derived from the calibrated analytical model to a simulation system;

providing the first neural network model or data derived from the first neural network model to a simulation system;

providing the second neural network model or data derived from the second neural network model to a simulation system;

setting up automatic synthetic rock file generation workflow; and visually presenting the second neural network model or visually present cutter/rock interaction information.

17. The computer-readable medium of claim 15, wherein the operations further comprise refining the first neural network model or the second neural network model based on experimental data.

18. The computer-readable medium of claim 15, wherein the calibrated analytical model is calibrated using model-based inversion.

19. The computer-readable medium of claim 15, wherein the training the first neural network and the training the second neural network are based on machine learning techniques.

20. The computer-readable medium of claim 15, wherein:

the first neural network is used to obtain cutter rock forces based on:
cutter size,
confinement pressure,
back rake angle,
side rake angle, and
depth; and the second neural network model is used to obtain cutter rock forces based on:
rock type,
cutter size,
confinement pressure,
back rake angle,
side rake angle, and
depth.

* * * * *